US007930914B1

(12) United States Patent
Taylor

(10) Patent No.: US 7,930,914 B1
(45) Date of Patent: Apr. 26, 2011

(54) ANTI-THEFT DEVICE

(76) Inventor: Richard Warren Taylor, Davie, FL (US)

( * ) Notice: Subject to any disclaimer, the term of this patent is extended or adjusted under 35 U.S.C. 154(b) by 0 days.

(21) Appl. No.: 12/718,662

(22) Filed: Mar. 5, 2010

Related U.S. Application Data

(60) Provisional application No. 61/281,837, filed on Nov. 23, 2009.

(51) Int. Cl.
*F16B 41/00* (2006.01)

(52) U.S. Cl. .................... 70/232; 70/14; 70/58; 70/181; 70/174; 70/56

(58) Field of Classification Search .................... 70/174, 70/177, 178, 180, 181, 201–203, 232, 14, 70/54–56, 58, 164, 230, 212; 92/15, 23, 92/27; 180/287; 280/764.1; 212/304
See application file for complete search history.

(56) References Cited

U.S. PATENT DOCUMENTS

| | | | | |
|---|---|---|---|---|
| 1,690,461 | A * | 11/1928 | Sieben | 137/382 |
| 2,912,847 | A | 12/1956 | Putman et al. | |
| 2,798,369 | A * | 7/1957 | Homan | 70/58 |
| 2,953,251 | A * | 9/1960 | Stone et al. | 211/4 |
| 3,269,159 | A * | 8/1966 | Young | 70/232 |
| 3,505,839 | A * | 4/1970 | Pavek | 70/230 |
| 3,550,409 | A * | 12/1970 | Pariser | 70/203 |
| 3,662,653 | A | 5/1972 | Carlson et al. | |
| 3,745,797 | A * | 7/1973 | Pavek | 70/232 |
| 4,027,798 | A * | 6/1977 | Swaim | 211/4 |
| 4,030,324 | A * | 6/1977 | Rizio | 70/232 |
| 4,041,738 | A * | 8/1977 | Vann | 70/212 |
| 4,058,994 | A * | 11/1977 | Coppola | 70/232 |
| 4,059,209 | A * | 11/1977 | Grisel | 294/147 |
| 4,122,758 | A * | 10/1978 | Bieringer et al. | 92/23 |
| 4,228,983 | A * | 10/1980 | Bowman, Jr. | 248/553 |
| 4,317,346 | A * | 3/1982 | Gutman | 70/238 |
| 4,326,747 | A * | 4/1982 | Finnegan | 294/147 |
| 4,360,074 | A | 11/1982 | Parquet | |

(Continued)

FOREIGN PATENT DOCUMENTS

GB 760863 A 6/1955

OTHER PUBLICATIONS

"Cabela's—Steer-Stop™ Steering Lock Set", website: http://www.cabelas.com/p-0031032014985a.shtml; 2 pages; printed Jan. 8, 2010.

(Continued)

*Primary Examiner* — Suzanne D Barrett
(74) *Attorney, Agent, or Firm* — Christopher Wood; Daniel Eisenberg; Premier Law Group, PLLC

(57) ABSTRACT

An anti-theft device for preventing theft of a boat fitted with an outboard motor. The anti-theft device is made up of a rear collar and a front collar. In one embodiment the rear collar comprises an elongated bracket having a U-shaped cross-section defined by first and second opposite sidewalls with a joining curved portion there-between. A nut cover is integral with and located at one end of the front collar. Complimentary locking teeth and locking teeth receiving apertures allow a user to affix the front and rear collars around an outboard motor's steering piston. Each of the front and rear collars are provided with locking tongues. In typical use a shackle is threaded through the locking tongues and attached to a padlock to secure the anti-theft device to the steering piston.

8 Claims, 16 Drawing Sheets

U.S. PATENT DOCUMENTS

| | | | | |
|---|---|---|---|---|
| 4,373,851 | A * | 2/1983 | Confoey | 414/722 |
| 4,389,862 | A * | 6/1983 | Hastings | 70/2 |
| 4,405,161 | A * | 9/1983 | Young et al. | 285/80 |
| 4,417,644 | A | 11/1983 | Brogard | |
| 4,502,306 | A | 3/1985 | Scammacca | |
| 4,557,458 | A | 12/1985 | Vahlberg et al. | |
| 4,557,470 | A * | 12/1985 | Link | 267/64.12 |
| 4,630,456 | A * | 12/1986 | Nielsen, Jr. | 70/232 |
| 4,658,607 | A * | 4/1987 | Muse et al. | 70/164 |
| 4,704,881 | A * | 11/1987 | Sloop, Sr. | 70/158 |
| 4,791,855 | A | 12/1988 | Matsui | |
| 4,949,661 | A | 8/1990 | Phillips et al. | |
| 5,036,683 | A * | 8/1991 | Geuvjehizian | 70/18 |
| 5,359,866 | A * | 11/1994 | Boddy | 70/18 |
| 5,737,946 | A * | 4/1998 | Sole et al. | 70/54 |
| 5,746,074 | A * | 5/1998 | Collins | 70/18 |
| 5,791,702 | A * | 8/1998 | Liroff | 292/307 R |
| 5,868,591 | A | 2/1999 | Kleeman et al. | |
| 5,983,684 | A | 11/1999 | Boisvert | |
| 6,146,221 | A | 11/2000 | Natsume | |
| 6,283,806 | B1 | 9/2001 | Schmidt | |
| 6,390,307 | B1 * | 5/2002 | Stelter | 211/60.1 |
| 6,405,570 | B1 | 6/2002 | Middleton et al. | |
| 6,467,315 | B1 | 10/2002 | Edmondson | |
| 6,520,067 | B1 | 2/2003 | Hunt et al. | |
| 6,553,797 | B2 | 4/2003 | Witchey | |
| 6,708,532 | B2 * | 3/2004 | Winland | 70/2 |
| 6,874,338 | B1 | 4/2005 | Hunt et al. | |
| 6,990,838 | B2 | 1/2006 | Witchey | |
| 7,018,253 | B2 * | 3/2006 | Li | 440/55 |
| 7,194,879 | B2 * | 3/2007 | Sedon et al. | 70/57.1 |
| 7,219,464 | B1 * | 5/2007 | Kujawa | 43/21.2 |
| 7,337,636 | B2 | 3/2008 | Witchey | |
| 7,874,188 | B2 * | 1/2011 | Chudzicki | 70/56 |
| 2004/0139770 | A1 * | 7/2004 | Curl | 70/14 |
| 2010/0192644 | A1 * | 8/2010 | Frantz | 70/174 |

OTHER PUBLICATIONS

"Steer Stop Steering Lock", website: http://www.bigedgesports.com/product.asp?pid=2040436&rf=gbase; 1 page; printed Jan. 8, 2010.

* cited by examiner

| Table 1 | |
|---|---|
| Part # or symbol | Element |
| *L* | overall length of anti-theft device 100 |
| *LA* | linkage arm |
| 100 | anti-theft device |
| 105 | anti-theft device 100 of the invention defines an overall longitudinal axis 105 |
| 120 | rear collar |
| 122 | longitudinal axis 122 of rear collar 120 |
| 124, 126 | first and second opposite ends 124 and 126 of rear collar 120 |
| 140 | front collar |
| 160 | nut cover 160 |
| 170 | optional cut-out in nut-cover 160 |
| 180 | elongated bracket |
| 200, 220 | first and second opposite side walls 200 and 220 of rear collar 120 |
| 225 | first side wall 200 defines a first locking tongue 225 |
| 227 | first locking tongue 225 defines aperture 227 therein |
| 240 | curved portion 240 of rear collar 120 |
| 260 | interior concave face 260 of curved portion 240 |
| 280, 300 | first and second sidewall edges 280 and 300 of first and second sidewalls 200 and 220, respectively |
| 310 | optional pad-lining 310 - can be disposed on at least a portion of the interior face 260 of the rear collar 120 |
| 315 | optional pad-lining 315 - can be disposed on at least a portion of the rear face 355 of plate 340 of front collar 140 |
| 320 | locking teeth 320 of rear collar 120 |
| 340 | a generally elongated plate 340 of front collar 140 |
| 344 | plate 340 defines an upper plate edge 344 and a lower plate edge 346 |
| 346 | plate 340 defines an upper plate edge 344 and a lower plate edge 346 |
| 348 | recessed edge 348 |
| 350 | front face 350 of plate 340 |

*FIG. 12A*

| Table 1 (continued) | |
|---|---|
| Part # or symbol | Element |
| 355 | rear face 355 of plate 340 |
| 357 | second locking tongue 357 |
| 358 | aperture 358 in second locking tongue 357 |
| 360 | receiving apertures 360 in plate 340 for receiving locking teeth 320 |
| 380, 400 | front collar 140 defines left and right ends 380 and 400 |
| 420 | a nut 420 on the end of a hydraulically driven steering piston rod 440 of an outboard motor 460 |
| 440 | hydraulically driven steering piston rod 440 |
| 460 | outboard motor |
| 480a | environmental perspective view of the anti-theft device 100 |
| 480b | close-up environmental perspective view 480b of the anti-theft device 100 |
| 520 | padlock |
| 540 | shackle 540 of padlock 520 |

*FIG. 12B*

ANTI-THEFT DEVICE

CROSS-REFERENCE TO RELATED APPLICATIONS

This application claims the benefit of priority from U.S. Provisional Patent Application Ser. No. 61/281,837 (filed Nov. 23, 2009). The entire content of U.S. Provisional Patent Application Ser. No. 61/281,837 is incorporated herein by reference in its entirety.

STATEMENT REGARDING FEDERALLY SPONSORED RESEARCH OR DEVELOPMENT

Not Applicable.

FIELD OF THE INVENTION

The present invention relates generally to anti-theft devices for water vessels. More specifically, the invention is an anti-theft device that helps prevent unauthorized control and use of a boat fitted with at least one outboard motor.

BACKGROUND OF THE INVENTION

Many watercraft employ outboard motors that are mounted on the aft end of the watercraft. Unauthorized use of such watercraft frequently involves manipulation of the outboard motor to steal or otherwise engage in inappropriate use of such watercraft. There is a need to prevent theft or unauthorized use of such watercraft.

SUMMARY OF THE INVENTION

An anti-theft device for preventing theft of a boat fitted with an outboard motor. The anti-theft device is made up of a rear collar and a front collar. In one embodiment the rear collar comprises an elongated bracket having a U-shaped cross-section defined by first and second opposite sidewalls with a joining curved portion there-between. A nut cover is integral with and located at one end of the front collar. Complimentary locking teeth and locking teeth receiving apertures allow a user to affix the front and rear collars around an outboard motor's steering piston. Each of the front and rear collars are provided with locking tongues. In typical use a shackle is threaded through the locking tongues and attached to a padlock to secure the anti-theft device to the steering piston.

BRIEF DESCRIPTION OF THE DRAWINGS

FIGS. 12A and 12B show a Table (Table 1) that includes a list of labels and reference numerals and the elements to which they refer.

DETAILED DESCRIPTION

The present invention is directed to an anti-theft device that helps prevent unauthorized control and use of a boat fitted with at least one outboard motor. The anti-theft device of the present invention is denoted generally by the numeric label "100".

Figure 9:
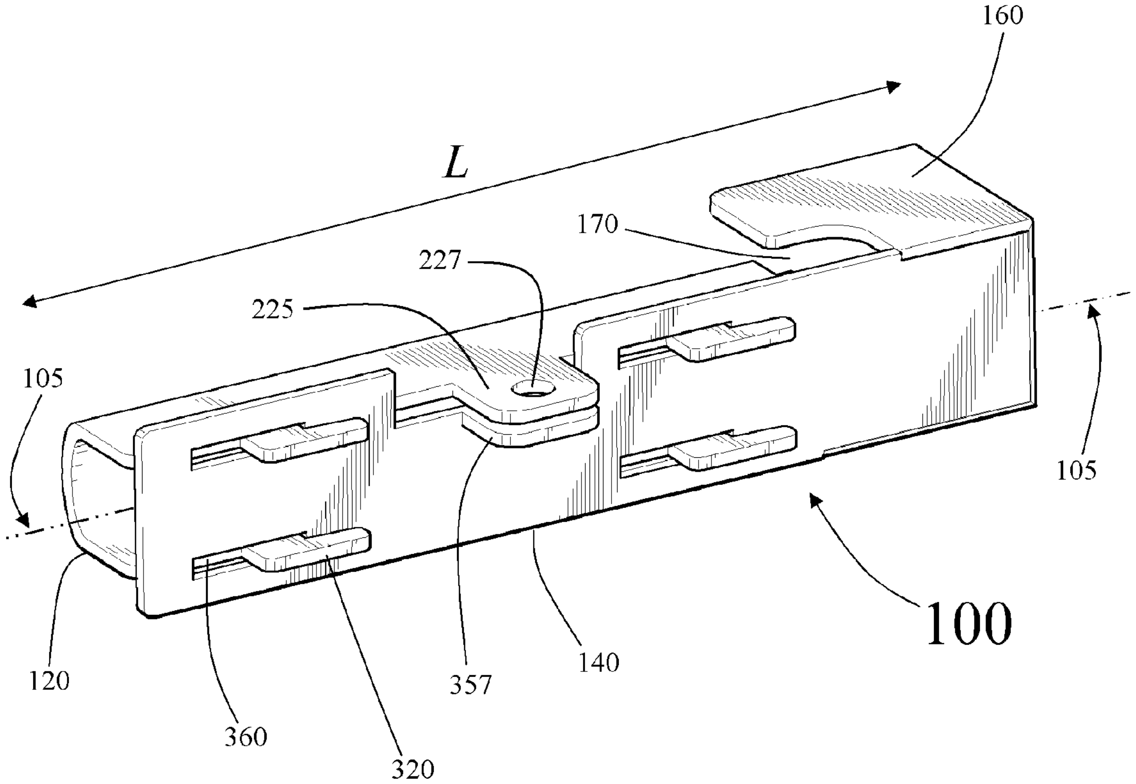
FIG. 9 shows a perspective view of an anti-theft device according to the invention.

It will be understood that the terms "upper and lower", "front and rear", "left and right", and "top and bottom" are used for convenience to describe relative directional reference in the common orientation of the anti-theft device 100 as shown, for example, in FIG. 9. However, it will be appreciated that the anti-theft device 100 can be operated in other orientations.

Referring to the Figures in general with regard to which a summary of the component parts that make up various embodiments of the anti-theft device 100 are listed in Table 1 (see FIGS. 12A and 12B). The anti-theft device 100 of the invention defines an overall longitudinal axis 105. The anti-theft device 100 is made up of a rear collar 120 and a front collar 140. The front collar 140 includes a nut cover 160. The nut cover 160 is attached to one end of the front collar 140.

The rear collar 120 comprises an elongated bracket having a U-shaped cross-section defined by first and second opposite sidewalls 200 and 220 with a joining curved portion 240 there-between; the curved portion 240 defines an interior concave face 260. In a preferred embodiment the first and second sidewalls 200 and 220 are substantially parallel with respect to each other, and still more preferably are parallel with respect to each other.

Figure 1:
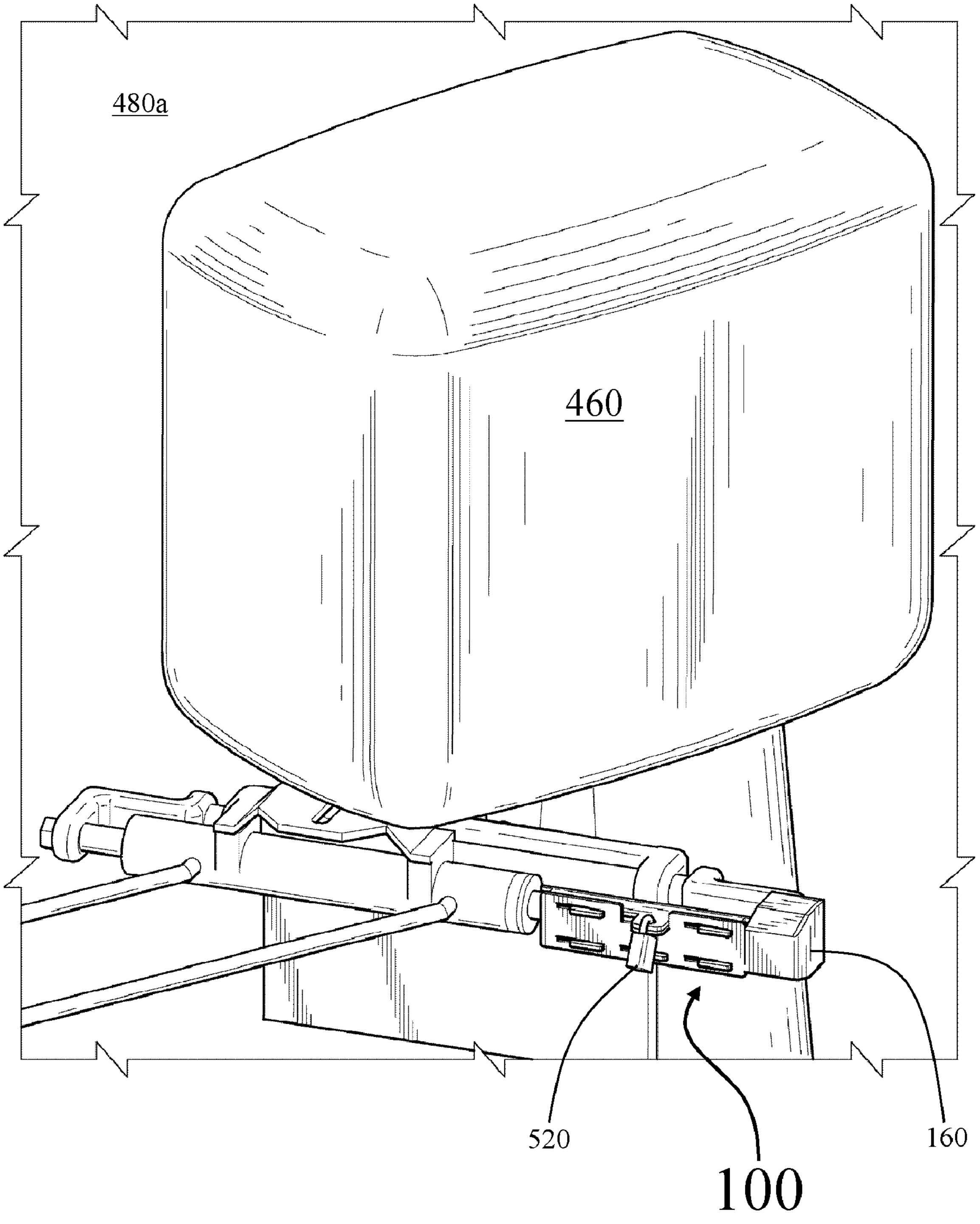
FIG. 1 shows a perspective environmental view of an anti-theft device according to the invention.

The first and second sidewalls 200 and 220 respectively define first and second sidewall edges 280 and 300. The first and second sidewall edges 280 and 300 are provided with integral projections in the form of locking teeth 320 located at spaced points along the first and second sidewall edges 280 and 300. During normal use of the anti-theft device 100, the first and second sidewalls 200 and 220 are in a generally horizontal configuration with the first sidewall 200 located above the second sidewall 220. However, the anti-theft device 100 could be fitted to an angled or vertically orientated steering piston rod 440 in which case the first and second sidewalls are located opposite each other in an angled or vertical plane. For example, anti-theft device 100 could be installed on the opposite side of an outboard steering system by turning, for example, the outboard steering piston rod 440 to the fully extended position in the opposite direction to that shown, for example in FIG. 2, and inverting the anti-theft device 180 degrees thereby placing the nut cover 160 over the opposite left end of steering piston rod 440 instead of the right end as shown in FIGS. 1 and 3.

In addition to covering the locking nut on the end of the hydraulic piston, the nut cover 160 also prevents the axial rotation of the anti-theft device 100. This functionality of the lock nut cover 160 prevents the anti-theft device 160 from rotating. Preventing unwanted rotation of the anti-theft device is desirable to prevent damage to the steering mechanism, outboard motor or the boat to which the outboard is attached should the motor be tilted.

The first sidewall 200 defines a first locking tongue 225. The first locking tongue 225 includes an aperture 227 therein for receiving therethrough a shackle of a lock, the first locking tongue 225 is integral with and extends outward from the first sidewall edge 280 of first sidewall 200.

An optional pad-lining 310 can be disposed on at least a portion of the interior face 260 of the rear collar 120. The optional pad-lining 310 helps prevent scratching or harm to the piston steering rod 440, which might otherwise occur when the rear collar 120 is placed behind and in contact with the piston steering rod 440.

The front collar 140 comprises a generally elongated plate 340 with one end of the plate 340 integral with, and attached to, a nut cover 160. The plate 340 defines a front face 350 and a rear face 355. The plate 340 is populated with receiving apertures 360 positioned for receiving the locking teeth 320 of the rear collar 120.

The front collar 140 defines opposite left and right ends 380 and 400 as viewed looking directly at the front face 350 of the front collar 140. The nut cover 160 is located at the right end 400 of the front collar 140. In normal use of the anti-theft device 100 the nut cover 160 fits around a nut 420 on the end of a hydraulically driven steering piston rod 440 of an outboard motor 460 (see FIGS. 1 through 3). The nut cover 160 prevents, for example, a would-be boat thief from unscrewing and removing nut 420 and slipping the anti-theft device off the steering piston rod 440.

The plate 340 defines an upper plate edge 344 and a lower plate edge 346, a portion of which is recessed thereby defining a recessed edge 348. A second locking tongue 357 extends outward from the recessed edge 348 at a perpendicular angle with respect to front face 350 of plate 340. The second locking tongue 357 includes an aperture 358 for receiving therethrough a shackle of a lock. During normal use of the anti-theft device 100, the first and second locking tongues 225 and 357, and their respective apertures 227 and 358, align with respect to each other such that first and second locking tongues 225 and 357 can cooperatively receive a portion of a shackle of a lock. A boat user or operator can thread a shackle of a lock through both locking tongues 225 and 357 and more specifically through apertures 227 and 358. The recessed edge 348 enables locking tongue 357 to fit snuggly below locking tongue 225 as shown, e.g., in FIGS. 8 and 9.

An optional pad-lining 315 can be disposed on at least a portion of the rear face 355 of plate 340 of front collar 140. The optional pad-lining 355 helps prevent scratching or harm to the piston steering rod 440, which might otherwise occur when the front collar 140 is placed in contact with the piston steering rod 440.

The anti-theft device 100 can be made out of any suitable material such as a plastic resistant to wear and tear, metal or metal alloy. For example, the anti-theft device 100 can be made of mild steel where the main alloying constituent is carbon in the range of 0.16-0.29% by weight. The anti-theft device can be made out of 316L stainless steel for strength and corrosion resistance.

A coating can be applied to the anti-theft device 100 to prevent the device 100 scratching the steering piston rod 440. For example, a liquid coating or a powder coating can be applied to the front and rear collars 120 and 140, and the nut cover 160. A powder coating can be applied electrostatically and then cured under heat. The powder may be a thermoplastic or a thermoset polymer. Powder coatings are described, for example, in U.S. Pat. Nos. 4,281,076, 4,211,691, and 6,599,992. U.S. Pat. Nos. 4,281,076, 4,211,691, and 6,599,992 are incorporated by reference herein in their entirety.

Figure 2:
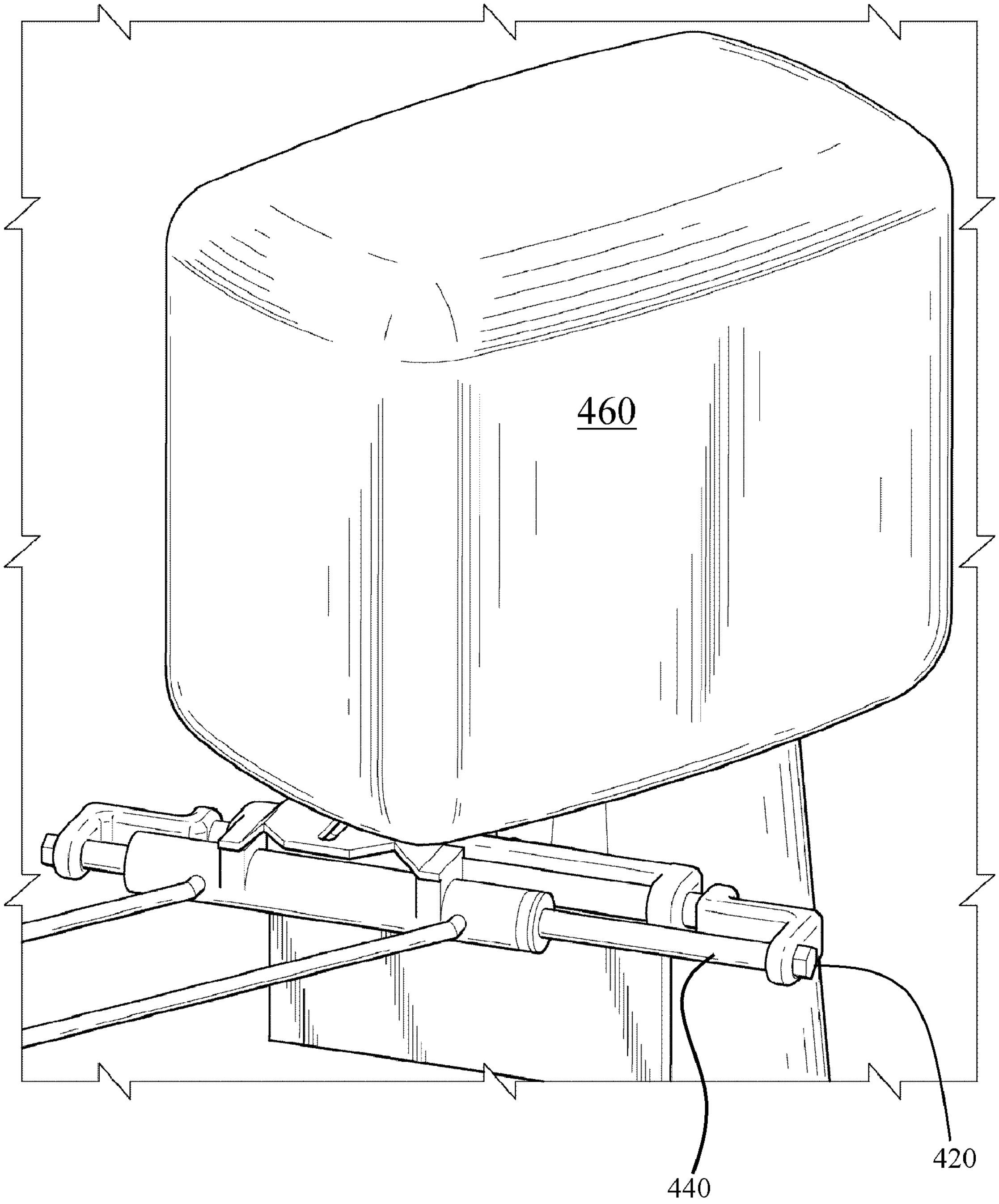
Fig. 2 (prior art)
FIG. 2 shows a perspective view of a piston steering rod not fitted with an anti-theft device according to the invention.
Figure 3:
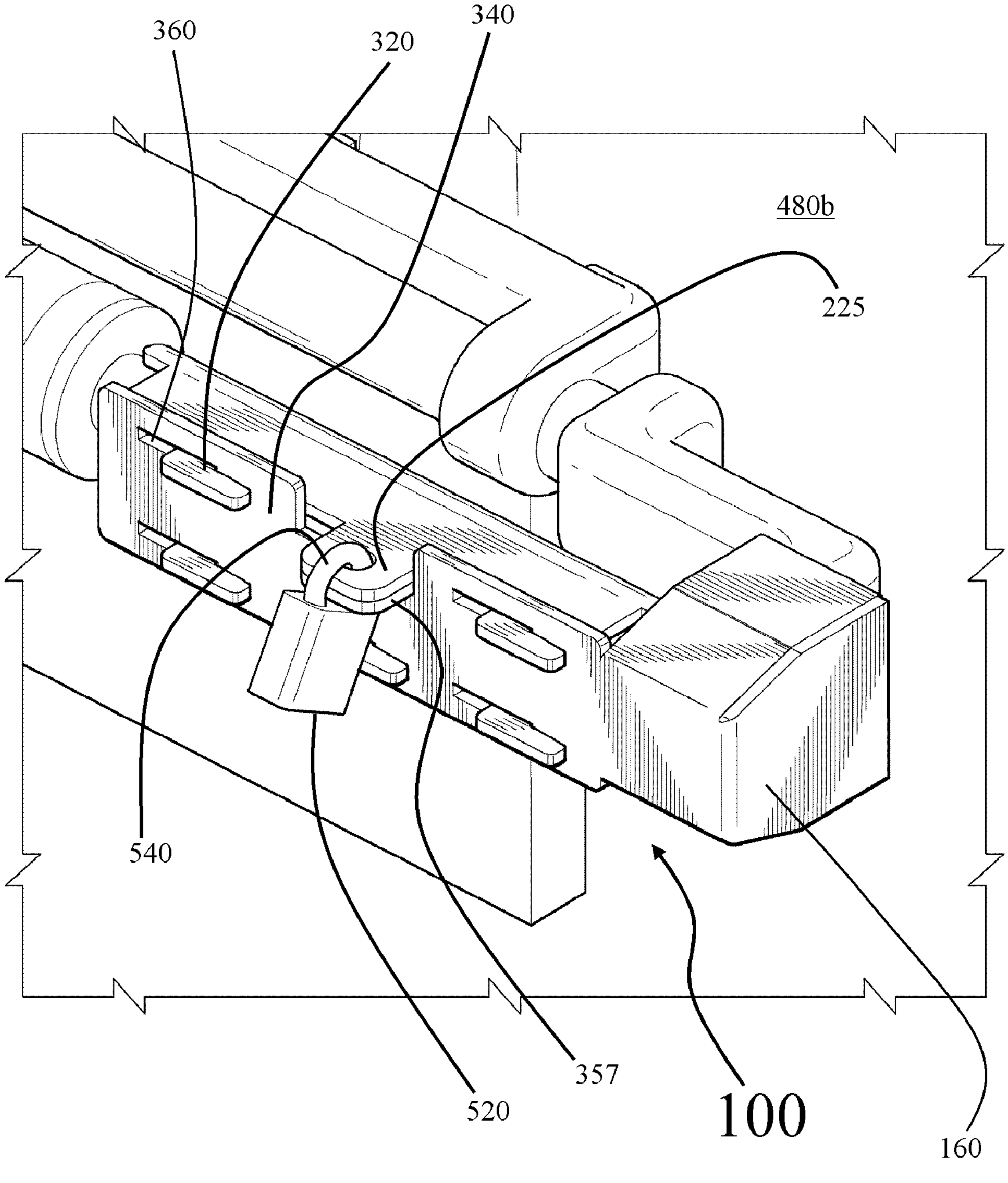
FIG. 3 shows a close up view of the anti-theft device of FIG. 1.

With reference to FIGS. 1 and 2 of which FIG. 1 is an environmental perspective view 480*a* of the anti-theft device 100 according to the invention. The anti-theft device 100 is shown fitted to an outboard motor 460, and more particularly to a hydraulically driven steering piston rod 440 (shown in FIG. 2), which forms part of a typical outboard motor steering mechanism. The anti-theft device 100 is best fitted to the steering piston rod 440 when the steering piston rod 440 is in an extended position. For comparison, FIG. 2 shows the hydraulically driven steering piston rod 440 of the outboard motor 460 in its extended position absent the anti-theft device 100. Labels and numbers shown in FIGS. 1 and 2 are described in Table 1 (see FIGS. 12A and 12B).

It should be understood that the anti-theft device 100 can also be fitted to a piston rod 440 that is not in a fully extended position. For example, the anti-theft device 100 can also be fitted to a piston rod 440 that is in a partly extended position; this is achieved by fitting an anti-theft device 100 of selected or predetermined length L that enables a user to fit the anti-theft device 100 to a partly extended piston rod 440.

FIG. 3 shows a close-up environmental perspective view 480*b* of the anti-theft device 100 fitted to a hydraulically driven steering piston rod 440 in its extended position. A padlock 520 is shown fitted to the anti-theft device 100 to secure the anti-theft device 100 to the piston rod 440 to prevent unauthorized operation of the steering piston rod 440 thereby rendering it difficult to steer the outboard motor 460 (the steering piston rod 440 is not visible in FIG. 3). More specifically, the shackle 540 of padlock 520 is shown fitted through aligned first and second locking tongues 225 and 357. It should be understood that while a padlock 520 is shown in FIG. 3, any lock with a shackle can be used. Flexible shackles such as a steel cable or loop can be inserted through aligned locking tongues 225 and 357 and the ends of the cable or loop secured to a padlock. A flexible shackle is described in U.S. Pat. No. 4,126,024. U.S. Pat. No. 4,126,024 is herein incorporated by reference in its entirety.

Figure 4:
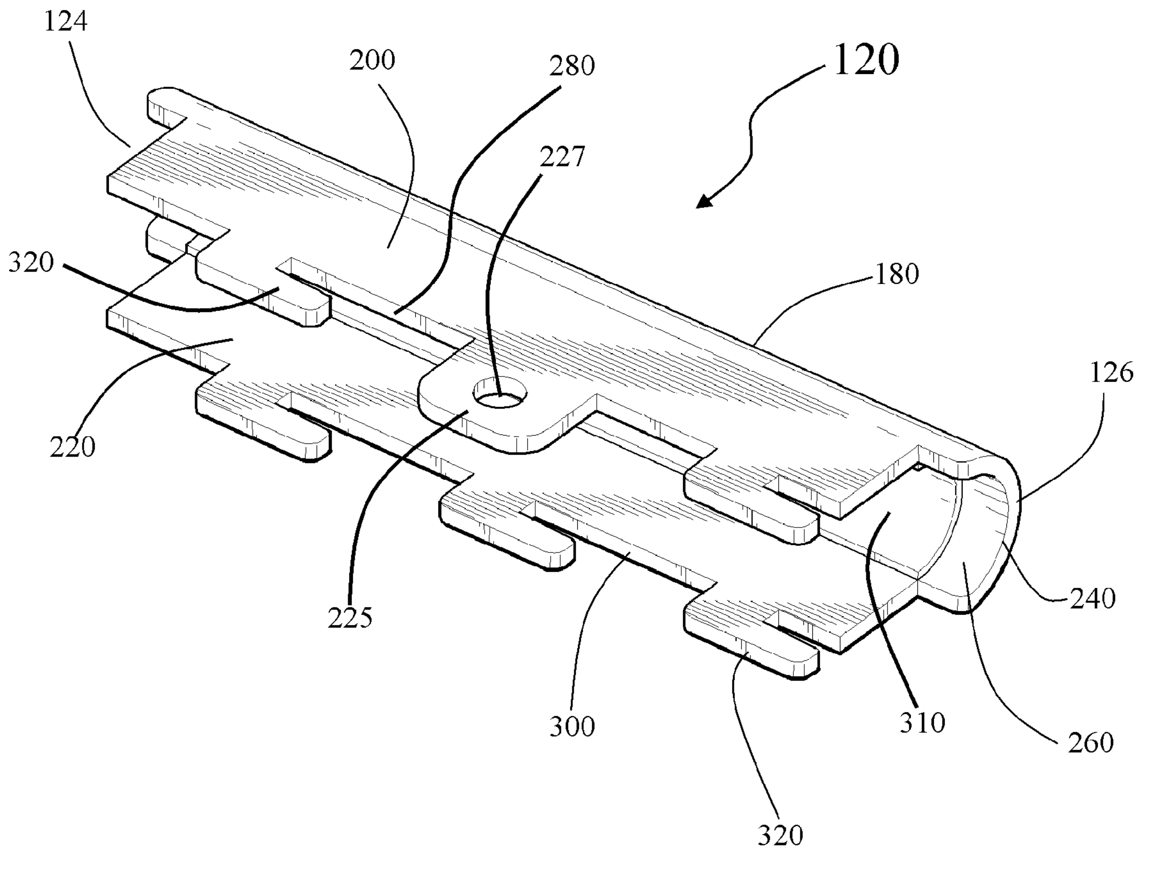
FIG. 4 shows a perspective view of a rear collar according to the invention.
Figure 5:
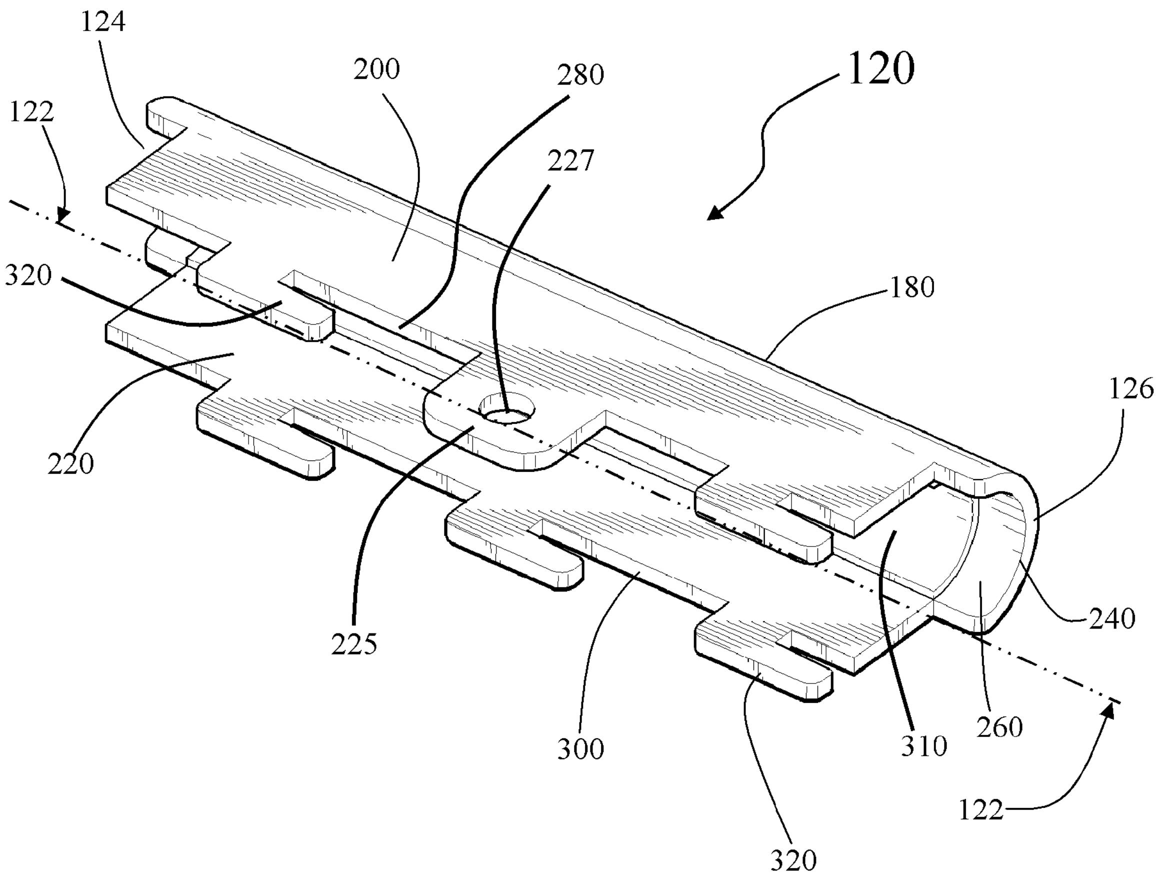
FIG. 5 shows a perspective view of a rear collar according to the invention.
Figure 10:
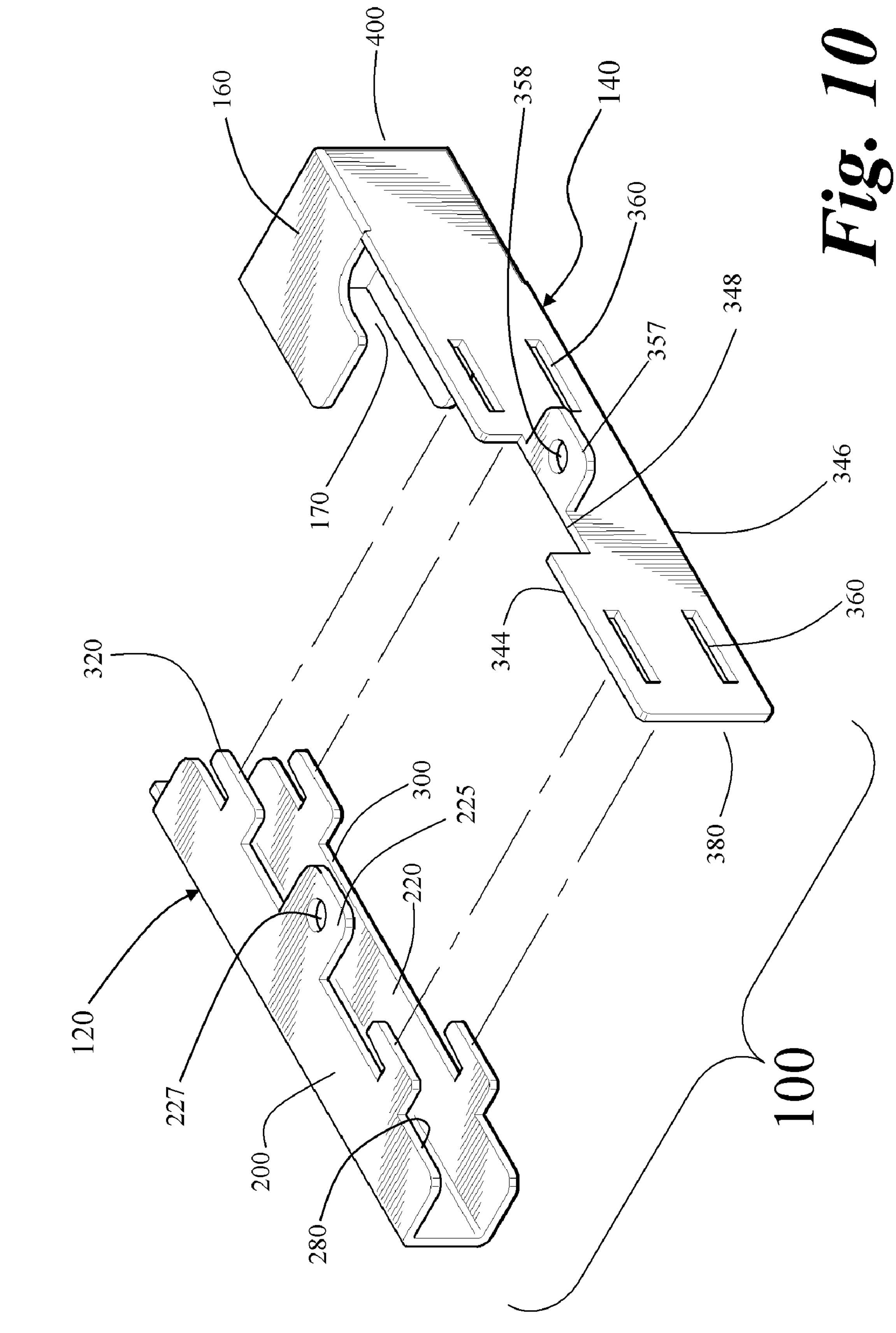
FIG. 10 shows front and rear collars according to the invention, wherein the rear collar has a rectangular U-shaped cross-section.
Figure 11:
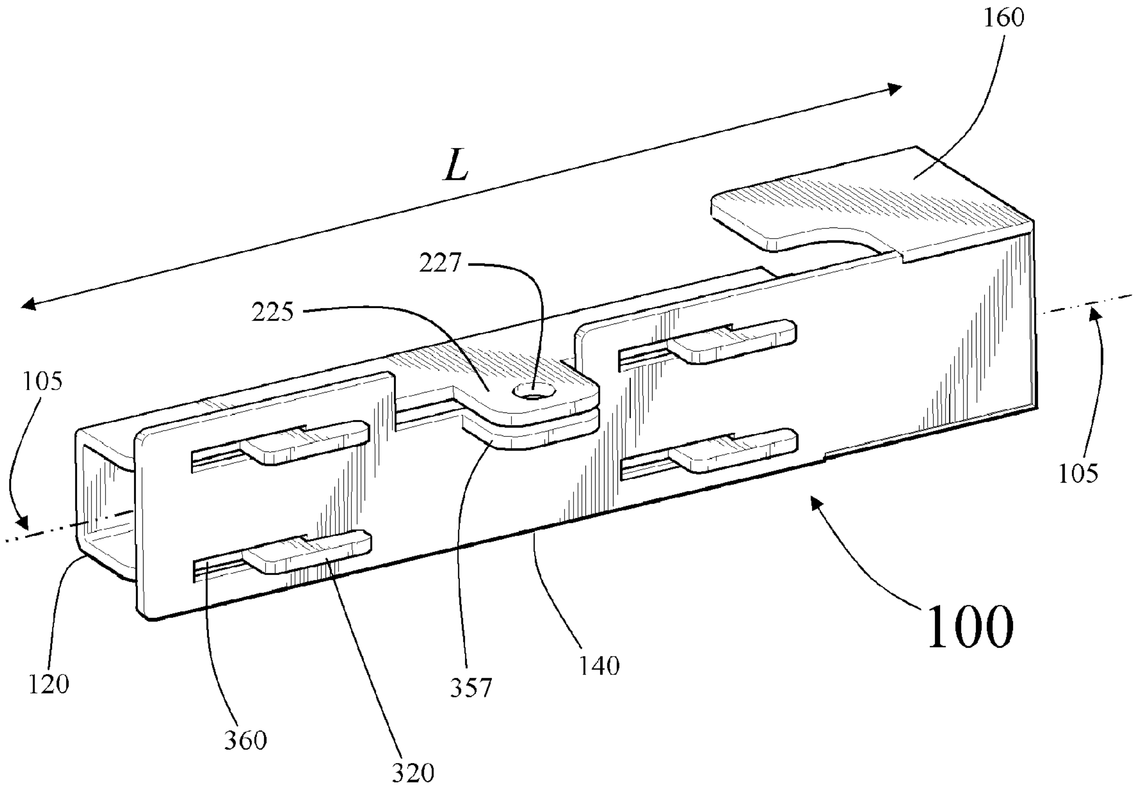
FIG. 11 shows front and rear collars according to the invention, wherein the rear collar has a rectangular U-shaped cross-section.

FIGS. 4 and 5 show perspective views of the rear collar 120. The rear collar 120 is an elongated bracket with a U-shaped cross-section defined by first and second opposite sidewalls 200 and 220 with a joining curved portion 240 there-between; the curved portion 240 defines an interior concave face 260. It should be understood that the rear collar 120 is not limited to the cross-section shape as shown in FIGS. 4 and 5. The rear collar 120 can have a rectangular cross-section shape as shown in FIGS. 10 and 11. Labels and numbers shown in FIGS. 4, 5, 10 and 11 are described in Table 1 (see FIGS. 12A and 12B).

Figure 6:
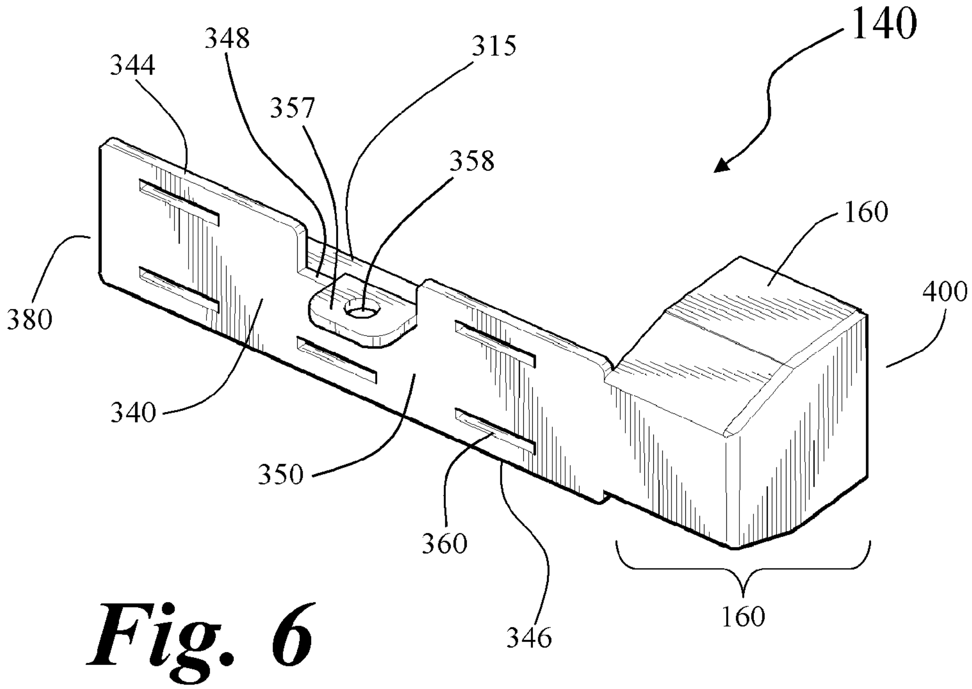
FIG. 6 shows a perspective view of a front collar according to the invention.
Figure 7:
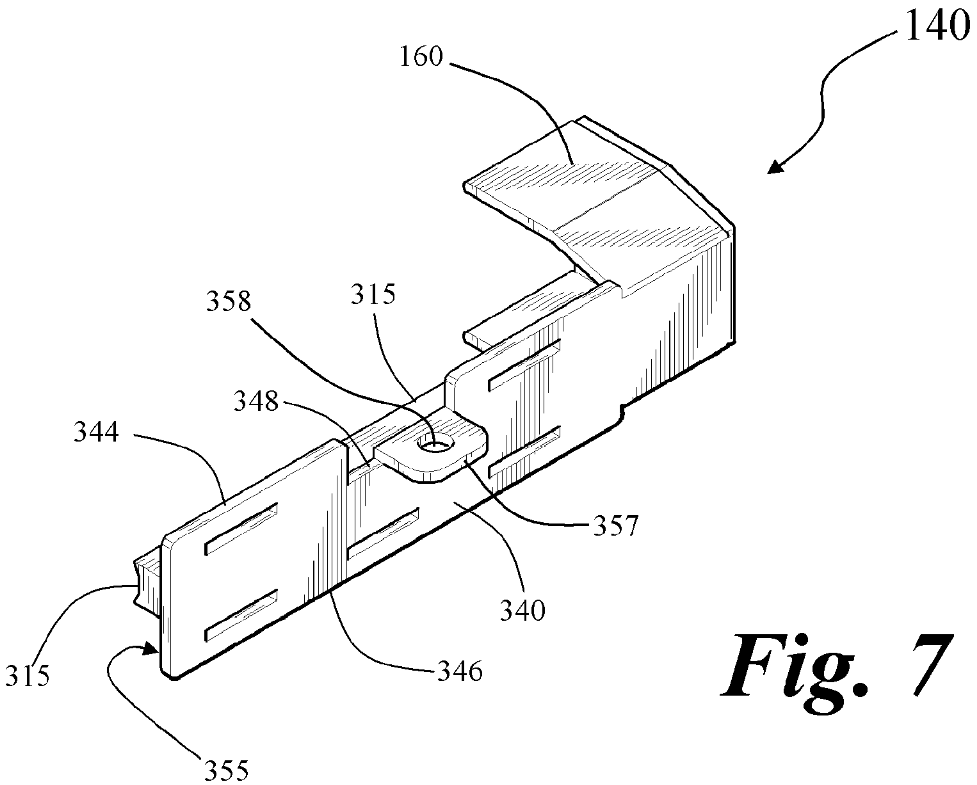
FIG. 7 shows a perspective view of a front collar according to the invention.

FIGS. 6 and 7 show perspective views of the front collar 140. The front collar 140 comprises a generally elongated plate 340 with one end of the plate 340 integral with, and attached to, a nut cover 160. The plate 340 defines a front face 350 and a rear face 355. The plate 340 is populated with receiving apertures 360 positioned for receiving the locking teeth 320 of the rear collar 120. Labels and numbers shown in FIGS. 6 and 7 are described in Table 1 (see FIGS. 12A and 12B).

Figure 8:
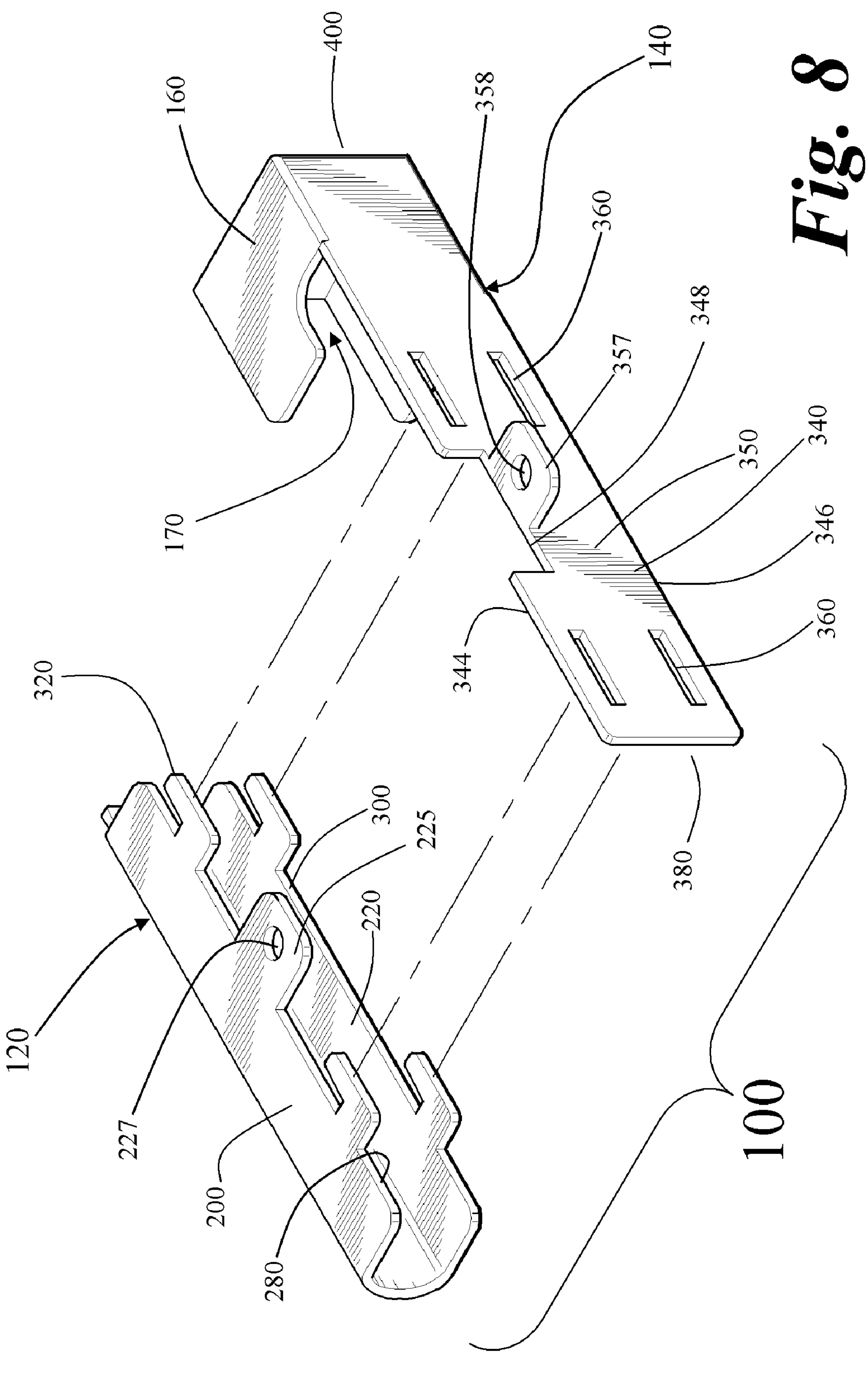
FIG. 8 shows front and rear collars according to the invention.
Figure 13:
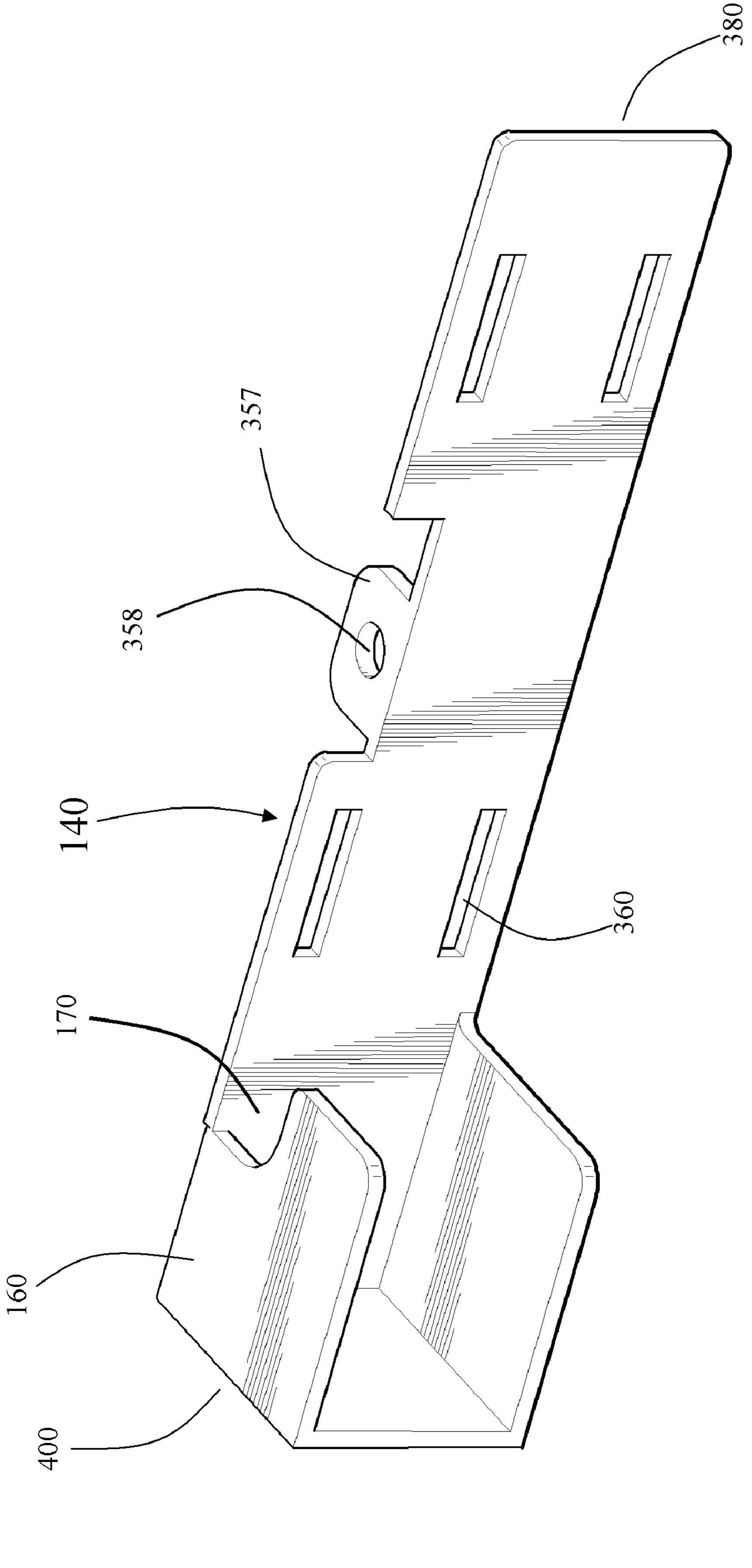
FIG. 13 shows a rear perspective view of a front collar according to one embodiment of the present invention.
Figure 14:
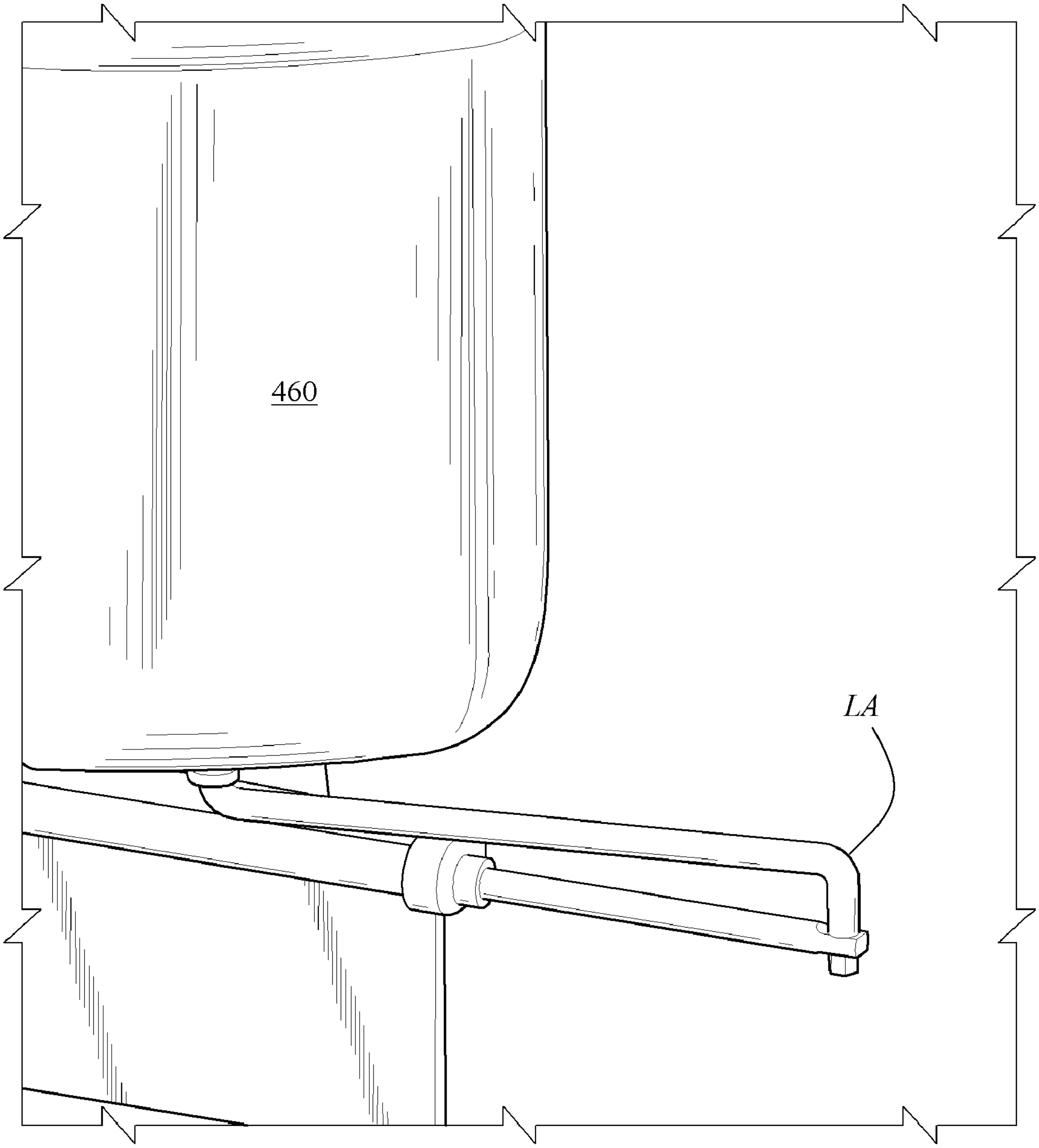
Fig. 14 (prior art)
FIG. 14 shows an example of a prior art outboard motor setup.
Figure 15:
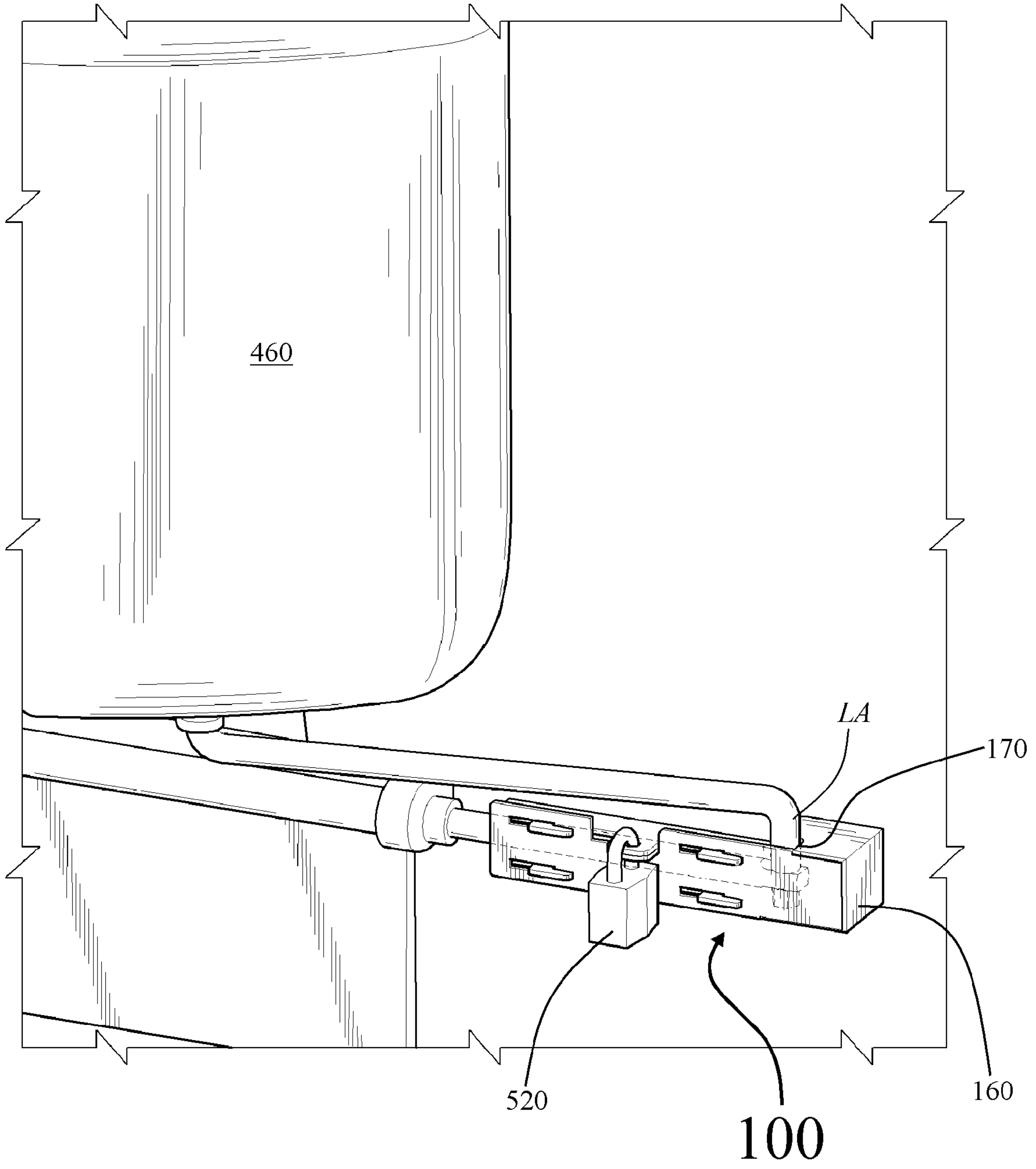
FIG. 15 shows a perspective environmental view of an anti-theft device according to the invention.
Figure 16:
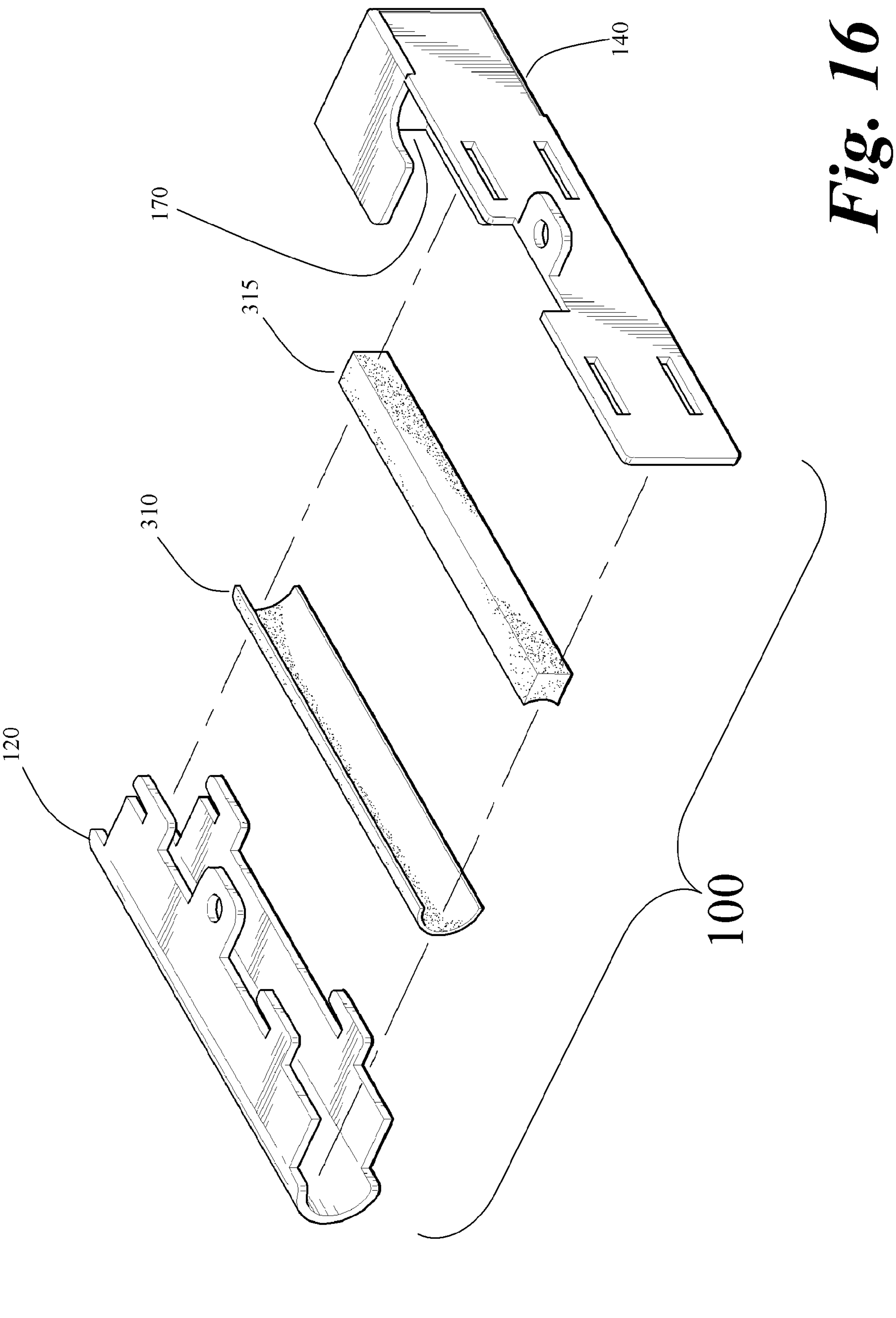
FIG. 16 shows an exploded view of an anti-theft device according to the invention.

FIGS. 8 and 9 show how the rear and front collars 120 and 140 fit together. In typical use the rear and front collars 120 and 140 are fitted around a steering piston rod 440 (shown in FIG. 2). Labels and numbers shown in FIGS. 8 and 9 are described in Table 1 (see FIGS. 12A and 12B). FIGS. 8 and 9 also show a nut cover 160 with an optional at least one cutout 170; a rear perspective view of the at least one cutout 170 in nut-cover 160 of the front collar 140 is shown in FIG. 13. This modified form of nut cover 160 allows the anti-theft device 100 to be fitted to a linkage arm of an outboard motor's steering system. More specifically, the cutout 170 enables the nut cover 160 of front collar 140 to accommodate a linkage arm LA. FIG. 14 shows a linkage arm LA; and FIG. 15 shows the anti-theft device 100 with a cutout 170 fitted around a linkage arm LA. FIG. 16 shows an exploded view of an anti-theft device with a cut-out 170.

FIGS. 9 and 10 show one embodiment of the invention in which the rear collar 120 has a rectangular U-shaped cross-section thereby demonstrating that the rear collar 120 is not limited to a curved U-shaped cross-section.

It is to be understood that the present invention is not limited to the embodiments described above, but encompasses any and all embodiments within the scope of the spirit of the present invention.

What is claimed:

1. An anti-theft device to help prevent theft of a water-craft fitted with an outboard motor with a steering piston rod, comprising:

a rear collar comprising an elongated bracket having a U-shaped cross-section made up of first and second side walls with a curved portion there-between, said first and second sidewalls respectively defining first and second sidewall edges, wherein a plurality of locking teeth are located at spaced points on each edge of said first and second sidewall edges, wherein a first locking tongue extends from said first sidewall edge, said first locking tongue defining an aperture therein; and a front collar comprising a plate with apertures therein for receiving said locking teeth, said front collar defining left and right opposite ends with a nut cover located at the right end, said plate defining upper and lower plate edges with a recessed edge in the upper plate edge and a second locking tongue extending outward from said recessed edge, said second locking tongue defining an aperture therein wherein during normal use the front and rear collars are fitted around the steering piston rod of an outboard motor with said nut cover disposed over one end of the steering piston rod and said first and second locking tongues align such that a shackle of a lock can be inserted through said first and second locking tongues.

2. The anti-theft device of claim 1, wherein said curved portion of said rear collar defines an interior concave face, said concave face is at least partly lined with a pad-lining.

3. The anti-theft device of claim 1, wherein said plate of said front collar defines a rear face, said rear face is at least partly lined with a pad-lining.

4. The anti-theft device of claim 1, wherein said curved portion and said plate are each at least partly lined with a pad-lining.

5. The anti-theft device of claim 1, wherein said front and rear collars are made of steel.

6. The anti-theft device of claim 1, wherein said front and rear collars are coated with a polymer.

7. The anti-theft device of claim 1, wherein said front and rear collars are coated with a thermoset polymer.

8. The anti-theft device of claim 1, wherein said nut cover includes a cut-out.

* * * * *